INVENTORS
HEINRICH WAGNER
HANS-CH. VON FRAUNBERG

United States Patent Office 3,447,394
Patented June 3, 1969

3,447,394
STEERING SPINDLE BEARING SUPPORT
Heinrich Wagner, Schwabisch Gmund, and Hans-Ch. von Fraunberg, Alfdorf, Germany, assignors to Zahnradfabrik Friedrichshafen Aktiengesellschaft, Friedrichshafen, Germany, a corporation of Germany
Filed June 26, 1967, Ser. No. 648,648
Claims priority, application Germany, June 25, 1966, Z 12,292
Int. Cl. F16h 1/20
U.S. Cl. 74—424.8        5 Claims

ABSTRACT OF THE DISCLOSURE

The invention relates to steering spindles for vehicles and bearing support of such spindles in which radial support is effected by the conventional ball bearing worm at the end of the spindle in conjunction with a ball bearing spaced therefrom and wherein axial and radial support is effected by the latter ball bearing.

---

Prior art devices having bearing mounts for steering spindles are shown in the following patents: U.S. 2,827,123; British 781,751; and German 1,137,964.

The prior art devices all have drawbacks relating primarily to the difficulties of mounting and adjusting in order to provide proper support and smooth action of the rotating spindle. The present invention overcomes such drawbacks and effects simplicity and economy as compared with the prior art.

Briefly, the invention comprises a spindle mount wherein the end of the spindle has a threaded connection via a helix of ball bearings with a reciprocal nut which actuates the steering, all in a fairly conventional arrangement. However, the spindle, while supported radially by such ball arrangement, is further supported radially by a ball bearing spaced from the threaded end and having races of a unique construction. Thus, the spindle is provided with a groove to effect an inner race, and outer race means are provided by a pair of outer race members adjacent respective sides of a ball bearing array carried in the groove. The outer race members are socketed in a housing element or flange wherein another flange is utilized for locking the outer race members in position. Further, by providing raceway surfaces having a greater radius than the ball radius separate raceways are provided for the ball array with a suitable pressure angle so that both radial and axial forces exerted by the spindle can be safely absorbed by the races.

Figure 1:
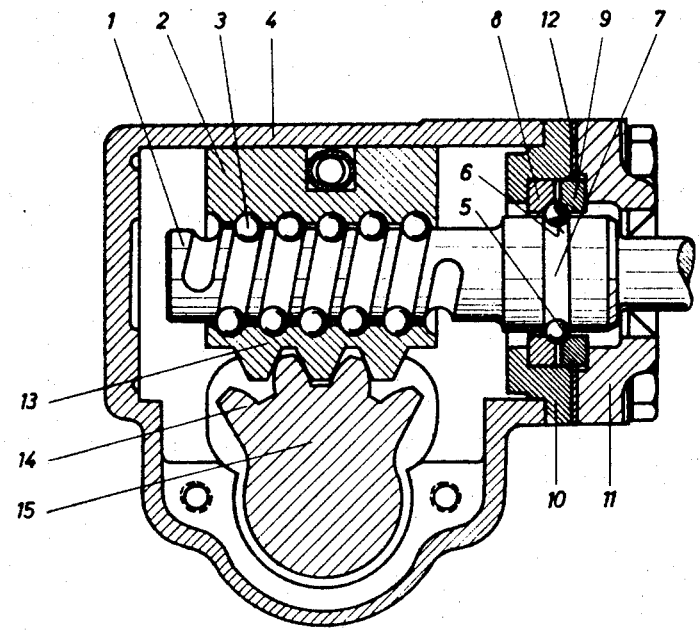
Figure 2:
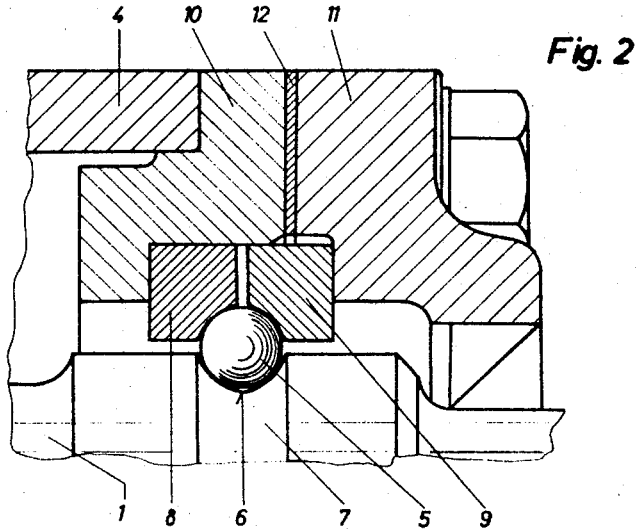

A more detailed description of the invention follows in conjunction with the appended drawing in which:

FIG. 1 shows a longitudinal cross section of the important components of the invention; and FIG. 2 is a magnified fragment of certain components of FIG. 1.

Referring to the drawing, the invention comprises a steering spindle 1 which, upon rotation, reciprocates a nut 2 by means of a ball helix array comprising a thread groove in the spindle and a helical array of balls 3. The preceding arrangement is generally conventional in steering mechanisms including the rack teeth 13 at the bottom of nut 2 which coacts with a gear segment 14 integral with a stub 15 which actuates the steering linkage (not shown).

An enclosing housing 4 is provided having an end flange 10 with a recess which carries a pair of outer ball race members 8 and 9 that retain an array of ball bearings, such as 5, in an inner raceway groove 7 machined into the spindle. An outer flange 11 is bolted or otherwise secured by a spacer ring 12 to the flange 10 to lock the outer race members in suitably encompassing position with respect to the ball array.

Referring to FIG. 2, it will be noted that the groove 7 is comprised of two curved surfaces which are non-concentric with the ball curavture and meet at the depression 6. The radius of curvature of these raceway surfaces is greater than the ball 5 radius. It will aslo be noted that the curavture of the raceway surfaces of the outer race members 8 and 9 is likewise greater than the ball radius.

By providing the above described difference in radii the ball array has four separate and distinct surfaces against which to bear and the effect is to provide a strong axial support for thrust forces on the spindle in either direction. The difference in radii between the ball and the raceway surfaces need not be great, but of the order of 10 to 20% larger for the raceway surfaces as compared with ball radius.

The construction provides a very simple arrangement for assembling and mounting the ball bearing on the spindle and within the housing wherein the ball array is substantially free of play radially and axially.

We claim:

1. The combination of a vehicle steering spindle and a support means therefor comprising a housing having a reciprocal nut therein slidable thereagainst for radial support of said spindle and a threaded ball race connection between the spindle and said nut, said support means further comprising a radial and thrust bearing having an inner raceway on said spindle and a ball array therein, a pair of outer race members on adjacent respective sides of said ball array and contiguous therewith and carried by said housing.

2. A combination as set forth in claim 1, including a flange carried by said housing, said outer race members being socketed in said flange.

3. A combination as set forth in claim 2, including an outer flange and a spacer element wherein one of said outer ball race members abuts within said first-named flange and said outer flange abuts the other outer race member and wherein said spacer element is disposed between said flanges, said outer flanges being secured to said housing whereby said outer race members are precisely positioned for engagement with said ball array.

4. A combination as set forth in claim 1 wherein said spindle is supported only by said nut and said radial and thrust bearing.

5. A combination as set forth in claim 4, wherein each of the outer race members has a raceway surface engaging a respective side of the ball array and being curved on a radius larger than the radius of balls in said array.

References Cited

UNITED STATES PATENTS

| 534,047 | 2/1895 | Meeker | 308—191 |
|---|---|---|---|
| 845,632 | 2/1907 | Gurney | 308—196 XR |
| 1,001,764 | 8/1911 | Linn | 308—196 |
| 2,759,243 | 8/1956 | Smith | 308—196 XR |
| 2,865,216 | 12/1958 | Bishop | 74—499 X |
| 3,362,761 | 1/1968 | Zachariassen | 308—199 X |

ROBERT M. WALKER, *Primary Examiner.*

L. H. GERIN, *Assistant Examiner.*

U.S. Cl. X.R.
74—422; 308—196